(12) United States Patent
Andrews et al.

(10) Patent No.: US 6,866,806 B2
(45) Date of Patent: Mar. 15, 2005

(54) METHODS FOR ASSEMBLING AN ELECTROCHEMICAL CELL

(75) Inventors: Craig C. Andrews, College Station, TX (US); Oliver J. Murphy, Bryan, TX (US); G. Duncan Hitchens, Bryan, TX (US)

(73) Assignee: Lynntech International, Ltd., College Station, TX (US)

( * ) Notice: Subject to any disclaimer, the term of this patent is extended or adjusted under 35 U.S.C. 154(b) by 0 days.

(21) Appl. No.: 10/262,558

(22) Filed: Sep. 30, 2002

(65) Prior Publication Data

US 2003/0080467 A1 May 1, 2003

Related U.S. Application Data

(62) Division of application No. 09/247,767, filed on Feb. 9, 1999, now Pat. No. 6,458,257.

(51) Int. Cl.⁷ .................. B29C 45/14; B29C 65/56
(52) U.S. Cl. .................. 264/250; 264/263; 264/271.1
(58) Field of Search ................... 264/102, 250, 264/251, 254, 259, 261, 263, 267, 268, 271.1, 273–275, 277; 429/35, 38, 39; 204/257, 258

(56) References Cited

U.S. PATENT DOCUMENTS

| | | | | |
|---|---|---|---|---|
| 3,846,176 A | * | 11/1974 | Kuhl | 429/36 |
| 4,122,242 A | * | 10/1978 | Feldhake | 429/174 |
| 4,224,736 A | * | 9/1980 | Feldhake | 29/623.2 |
| 4,416,747 A | | 11/1983 | Menth et al. | |
| 4,569,813 A | * | 2/1986 | Taki et al. | 264/259 |
| 4,720,334 A | | 1/1988 | DuBois | |
| 4,759,847 A | | 7/1988 | Medbury | |
| 4,759,849 A | | 7/1988 | Baumann et al. | |
| 4,836,929 A | | 6/1989 | Baumann et al. | |

(List continued on next page.)

FOREIGN PATENT DOCUMENTS

| | | |
|---|---|---|
| DE | 0822271 A2 | 7/1997 |
| DE | WO 97/41168 | 11/1997 |
| EP | 0 048 559 A2 | 3/1982 |
| EP | 01183071 | 7/1989 |
| EP | 0 342 169 A2 | 11/1989 |
| EP | 0 822 271 A3 | 4/1998 |
| EP | 196 53 034 A1 | 7/1998 |
| WO | WO 90/14312 | 11/1990 |
| WO | WO 97/25369 | 7/1997 |
| WO | WO 98/42617 | 10/1998 |
| WO | WO 99/04446 | * 1/1999 |
| WO | WO 01/35755 A1 | 5/2001 |

Primary Examiner—Angela Ortiz
(74) Attorney, Agent, or Firm—Streets & Steele; Jeffrey L. Streets; Frank J. Campigotto

(57) ABSTRACT

A method for securing an anode, a cathode and an ion exchange membrane disposed between the anode and the cathode within a premolded thermoplastic frame. The frame both secures the anode the cathode and the ion exchange membrane within the frame and further maintain the anode, cathode and membrane in intimate contact. Additionally, injection molding around the premolded thermoplastic frame may be performed or alternatively, injection molding around a plurality of thermoplastic frames.

10 Claims, 7 Drawing Sheets

U.S. PATENT DOCUMENTS

| | | | |
|---|---|---|---|
| 4,978,438 A | 12/1990 | Shimamune et al. | |
| 5,083,442 A | 1/1992 | Vlock | |
| 5,094,734 A | 3/1992 | Torrado | |
| 5,097,556 A | 3/1992 | Engel | |
| 5,114,549 A | 5/1992 | Shimamune et al. | |
| 5,121,612 A | 6/1992 | Guay et al. | |
| 5,135,645 A | 8/1992 | Sklenak et al. | |
| 5,158,454 A | 10/1992 | Viebahn et al. | |
| 5,187,025 A * | 2/1993 | Kelland et al. | 429/33 |
| 5,236,595 A | 8/1993 | Wang | |
| 5,266,215 A | 11/1993 | Engelhard | |
| 5,315,845 A | 5/1994 | Lee | |
| 5,433,866 A | 7/1995 | Hoppe | |
| 5,447,636 A | 9/1995 | Banerjee | |
| 5,464,480 A | 11/1995 | Matthews | |
| 5,498,347 A | 3/1996 | Richard | |
| 5,505,856 A | 4/1996 | Campen | |
| 5,542,264 A | 8/1996 | Hortin | |
| 5,547,584 A | 8/1996 | Capehart | |
| 5,582,717 A | 12/1996 | Di Santo | |
| 5,593,598 A | 1/1997 | McGinness et al. | |
| 5,618,492 A | 4/1997 | Auten | |
| 5,626,769 A | 5/1997 | Sawamoto | |
| 5,653,877 A | 8/1997 | Mark | |
| 5,654,109 A | 8/1997 | Plowman | |
| 5,656,246 A | 8/1997 | Patapoff | |
| 5,682,671 A | 11/1997 | Lund et al. | |
| 5,683,576 A | 11/1997 | Olsen | |
| 5,688,460 A * | 11/1997 | Ruschke | 264/263 |
| 5,707,518 A | 1/1998 | Coates | |
| 5,711,887 A | 1/1998 | Gastman et al. | |
| 5,715,699 A | 2/1998 | Coates | |
| 5,720,869 A | 2/1998 | Yamanaka et al. | |
| 5,741,416 A | 4/1998 | Tempest, Jr. | |
| 5,746,954 A | 5/1998 | Aikman | |
| 5,753,100 A | 5/1998 | Lumsden | |
| 5,759,970 A | 6/1998 | Prevost | |
| 5,766,453 A | 6/1998 | Morellato et al. | |
| 5,768,905 A | 6/1998 | Oh | |
| 5,785,864 A | 7/1998 | Teran et al. | |
| 5,787,537 A | 8/1998 | Mannillo | |
| 5,806,120 A | 9/1998 | McEachern | |
| 5,813,245 A | 9/1998 | Coates | |
| 5,824,274 A | 10/1998 | Long | |
| 5,997,702 A | 12/1999 | Koganezawa et al. | |
| 6,057,054 A * | 5/2000 | Barton et al. | 429/42 |
| 6,074,551 A | 6/2000 | Jones et al. | |
| 6,117,287 A * | 9/2000 | Molter et al. | 204/255 |
| 6,165,403 A * | 12/2000 | Michaelis et al. | 264/261 |
| 6,200,618 B1 | 3/2001 | Smith et al. | |
| 6,368,740 B1 * | 4/2002 | Dristy | 429/35 |
| 6,423,439 B1 * | 7/2002 | Barton et al. | 429/35 |
| 6,458,257 B1 | 10/2002 | Andrews et al. | |
| 6,596,427 B1 * | 7/2003 | Wozniczka et al. | 429/32 |
| 6,596,428 B2 * | 7/2003 | Gemberling | 429/34 |
| 6,602,631 B1 * | 8/2003 | Cisar et al. | 429/34 |
| 6,649,097 B2 * | 11/2003 | Sasaki et al. | 264/102 |
| 6,653,011 B2 * | 11/2003 | Dristy | 429/38 |
| 6,770,396 B2 * | 8/2004 | Hatoh et al. | 429/34 |

* cited by examiner

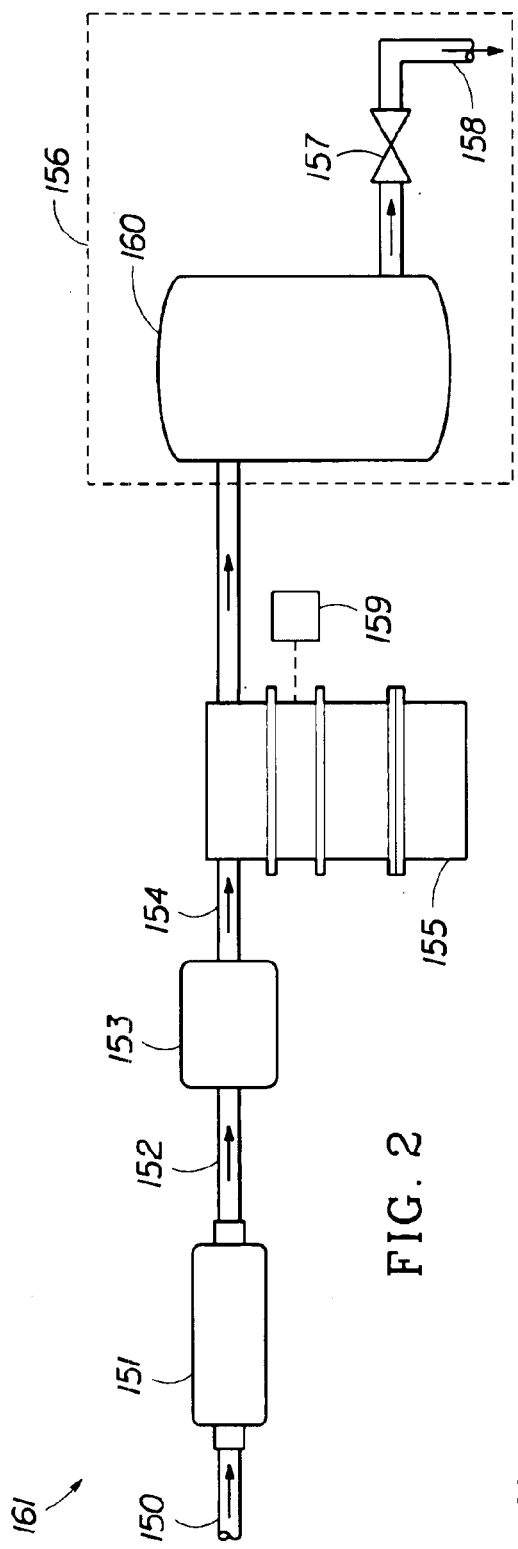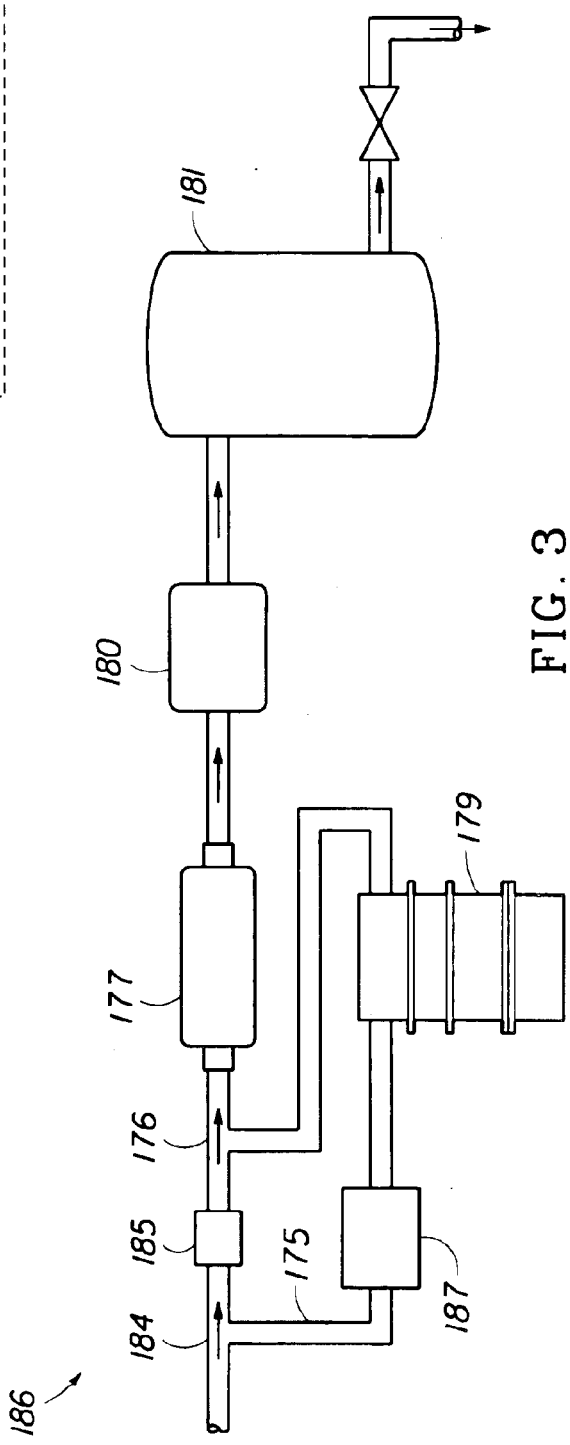

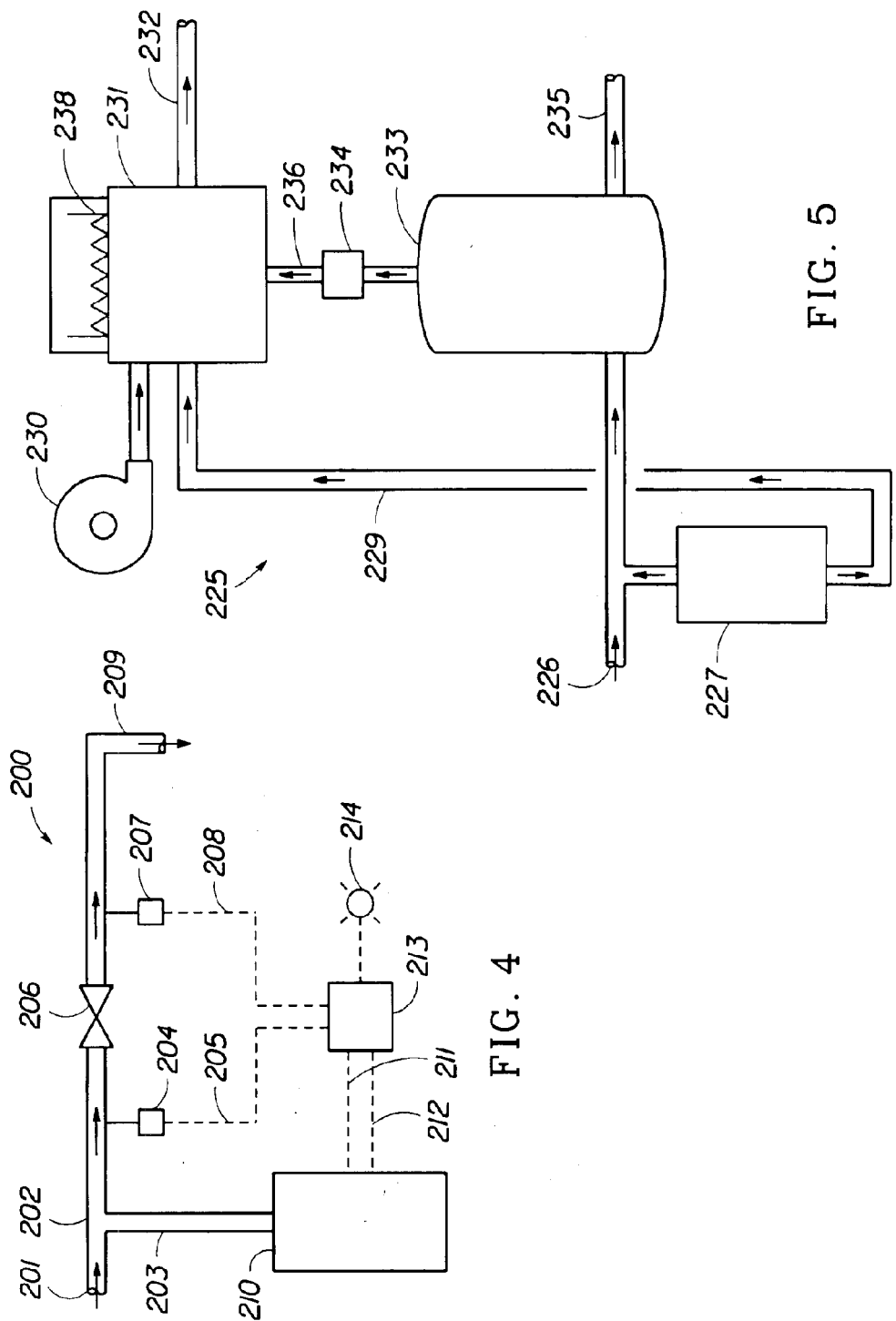

METHODS FOR ASSEMBLING AN ELECTROCHEMICAL CELL

This application is a divisional application of U.S. application Ser. No. 09/247,767 filed on Feb. 9, 1999 now U.S. Pat. No. 6,458,257.

BACKGROUND OF THE INVENTION

1. Field of the Invention

This invention relates to the production of ozone for the sterilization of point of use potable water sources such as reverse osmosis systems, refrigerators, drinking fountains, etc.

2. Background of the Related Art

Ozone has long been recognized as a useful chemical commodity valued particularly for its outstanding oxidative activity. Because of this activity, it finds wide application in disinfection processes. In fact, it kills bacteria more rapidly than chlorine, it decomposes organic molecules, and removes coloration in aqueous systems. Ozonation removes cyanides, phenols, iron, manganese, and detergents. It controls slime formation in aqueous systems, yet maintains a high oxygen content in the system. Unlike chlorination, which may leave undesirable chlorinated organic residues in organic containing systems, ozonation leaves fewer potentially harmful residues. Ozone has also been shown to be useful in both gas and aqueous phase oxidation reactions that may be carried out by advanced oxidation processes (AOPs) in which the formation of hydroxyl radicals (OH•) is enhanced by exposure to ultraviolet light. Certain AOPs may even involve a catalyst surface, such as a porous titanium dioxide photocatalyst, that further enhances the oxidation reaction. There is even evidence that ozone will destroy viruses. Consequently, it is used for sterilization in the brewing industry and for odor control in sewage treatment and manufacturing. Ozone may also be employed as a raw material in the manufacture of certain organic compounds, e.g., oleic acid and peroxyacetic acid.

Thus, ozone has widespread application in many diverse activities, and its use would undoubtedly expand if its cost of production could be reduced. For many reasons, ozone is generally manufactured on the site where it is used. However, the cost of ozone generating equipment and poor energy efficiency of producing ozone has deterred its use in many applications and in many locations.

On a commercial basis, ozone is currently produced by the silent electric discharge process, otherwise known as corona discharge, wherein air or oxygen is passed through an intense, high frequency alternating current electric field. The corona discharge process forms ozone ($O_3$) through the following reaction:

$$3/2 O_2 => O_3; \Delta H°_{298} = 34.1 \text{ kcal}$$

Yields in the corona discharge process generally are in the vicinity of 2% ozone, i.e., the exit gas may be about 2% $O_3$ by weight. Such $O_3$ concentrations, while quite poor in an absolute sense, are still sufficiently high to furnish usable quantities of $O_3$ for the indicated commercial purposes. Another disadvantage of the corona process is the production of harmful nitrogen oxides ($NO_x$). Other than the aforementioned electric discharge process, there is no other commercially exploited process for producing large quantities of $O_3$.

However, $O_3$ may also be produced through an electrolytic process by impressing an electric current (normally direct current (DC)) across electrodes immersed in an electrolyte, i.e., electrically conducting fluid. The electrolyte includes water which is dissociated by the electrolytic process into its respective elemental species, $O_2$ and $H_2$. Under the proper conditions, the oxygen is also evolved as the $O_3$ species. The evolution of $O_3$ may be represented as:

$$3H_2O => O_3 + 3H_2; \Delta H°_{298} = 207.5 \text{ kcal}$$

It will be noted that the $\Delta H°$ in the electrolytic process is many times greater than that for the electric discharge process. Thus, the electrolytic process appears to be at about a six-fold disadvantage.

More specifically, to compete on an energy cost basis with the electric discharge method, an electrolytic process must yield at least a six-fold increase in ozone yield. Heretofore, the necessary high yields have not been realized in any foreseeable practical electrolytic system.

The evolution of $O_3$ by electrolysis of various electrolytes has been known for well over 100 years. High yields up to 35% current efficiency have been noted in the literature. Current efficiency is a measure of ozone production relative to oxygen production for given inputs of electrical current, i.e., 35% current efficiency means that under the conditions stated, the $O_2/O_3$ gases evolved at the anode are comprised of 35% $O_3$ by weight. However, such yields could only be achieved utilizing very low electrolyte temperatures, e.g., in the range from about $-30°$ C. to about $-65°$ C. Maintaining the necessary low temperatures, obviously requires costly refrigeration equipment as well as the attendant additional energy cost of operation.

Ozone is present in large quantities in the upper atmosphere of the earth to protect the earth from the suns harmful ultraviolet rays. In addition, ozone has been used in various chemical processes and is known to be a strong oxidant, having an oxidation potential of 2.07 volts. This potential makes it the fourth strongest oxidizing chemical known.

Because ozone has such a strong oxidation potential, it has a very short half-life. For example, ozone which has been solubilized in waste water may decompose in a matter of 20 minutes. Ozone can decompose into secondary oxidants such as highly reactive hydroxyl radicals (OH•) and peroxyl radicals ($HO_2$•). These radicals are among the most reactive oxidizing species known. They undergo fast, non-selective, free radical reactions with dissolved compounds. Hydroxyl radicals have an oxidation potential of 2.8 volts (V), which is higher than most chemical oxidizing species including $O_3$. Most of the OH• radicals are produced in chain reactions where OH• itself or $HO_2$ • act as initiators.

Hydroxyl radicals act on organic contaminants either by hydrogen abstraction or by hydrogen addition to a double bond, the resulting radicals disproportionate or combine with each other forming many types of intermediates which react further to produce peroxides, aldehydes and hydrogen peroxide.

Electrochemical cells in which a chemical reaction is forced by added electrical energy are called electrolytic cells. Central to the operation of any cell is the occurrence of oxidation and reduction reactions which produce or consume electrons. These reactions take place at electrode/solution interfaces, where the electrodes must be good electronic conductors. In operation, a cell is connected to an external load or to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

Recent ozone research has been focused primarily on methods of using ozone, as discussed above, or methods of increasing the efficiency of ozone generation. For example, research in the electrochemical production of ozone has resulted in improved catalysts, membrane and electrode assemblies, flowfields and bipolar plates and the like. These efforts have been instrumental in making the electrochemical production of ozone a reliable and economical technology that is ready to be taken out of the laboratory and placed into commercial applications.

However, because ozone has a very short life in the gaseous form, and an even shorter life when dissolved in water, it is preferably generated in close proximity to where the ozone will be consumed. Traditionally, ozone is generated at a rate that is substantially equal to the rate of consumption since conventional generation systems do not lend themselves to ozone storage. Ozone may be stored as a compressed gas, but when generated using corona systems the output gas stream is essentially at atmospheric pressure. Therefore, additional hardware for compression of the gas is required, which in itself reduces the ozone concentration through thermal and mechanical degradation. Ozone produced by the corona process may also be dissolved in liquids such as water but this process generally requires additional equipment for introducing the ozone gas into the liquid, and at atmospheric pressure and ambient temperature only a small amount of ozone may be dissolved in water.

Because so many of the present applications have the need for relatively small amounts of ozone, it is generally not cost effective to use conventional ozone generation systems such as corona discharge. Furthermore, since many applications require the ozone to be delivered under pressure or dissolved in water, as for disinfecting, sterilizing, treating contaminants, etc., the additional support equipment required to compress and/or dissolve the ozone into the water stream further increases system cost.

Therefore, there is a need for an ozone generator system that operates efficiently on standard AC or DC electricity and water to deliver a reliable stream of ozone gas that is generated under pressure for direct use by the application. Still other applications would benefit from a stream of highly concentrated ozone that is already dissolved in water where it may be used directly or diluted into a process stream so that a target ozone concentration may be achieved. It would be desirable if the system was self-contained, self-controlled and required very little maintenance. It would be further desirable if the system had a minimum number of wearing components, a minimal control system, and be compatible with low voltage power sources such as solar cell arrays, vehicle electrical systems, or battery power.

SUMMARY OF THE INVENTION

A refrigerator is combined with an ozone generator water treatment system so that purified and disinfected water is available at an ice maker and/or water dispenser forming parts of the refrigerator. The water may be ozonated in a chilled treatment reservoir. Ozone may also be introduced up stream or down stream of the treatment reservoir to provide biofilm and microorganism control. Level and purity sensors are also provided for indicating the purified condition of the water.

The present invention relates to refrigerators supplied with either potable or purified water from which microorganisms can be eliminated using ozone.

Modern refrigerators are known which include a dispenser for dispensing chilled water and which further include an ice maker for dispensing ice cubes or ice chips. A wide variety of devices have been used to purify water, including particle filters, ultrafiltration, carbon filters, water softening systems, ion exchange systems, and reverse osmosis systems. In order to kill bacteria, viruses and other microorganisms, chlorine is commonly used. However, the chlorination of water is hazardous due to the formation of potentially harmful byproducts.

The present invention includes a water treatment system consisting of a carbon block, granulated activated carbon, reverse osmosis, and the like within or supplying a refrigerator to deliver chilled water to a dispenser, wherein the water has been treated with ozone prior to dispensing. The system of the present invention provides for generating ozone close by or within the refrigerator and engaging that ozone at one or more points in the water treatment system to control microbial growth either in the water conduits or on other water treatment devices that make up the water treatment system. The present invention integrates a water treatment system such as carbon block, granulated activated carbon, reverse osmosis, ozone generators and the like with a refrigerator to produce purified water that is free from microbial contamination.

One embodiment of the invention is defined by a refrigerator enclosure, a means of refrigerating the enclosure, a means for opening and closing the enclosure, an electrochemical ozone generator, a potable or purified water supply to the refrigerator, a means of connecting said water supply to the electrochemical ozone generator, a waste water discharge from the electrochemical ozone generator, and one or more connections to transfer ozone gas or ozonated water between the ozone generator and the potable or purified water stream. The potable or purified water stream is connected to the water inlet of the refrigerator and water from the potable or purified water stream is provided to an icemaker or a water dispenser for delivering microbial-free purified water. Water flowing through the water lines may be received under pressure, for example from a city water supply. The water stream may be subject to filtration processes such as carbon filtration, ultrafiltration or reverse osmosis. After passing through the treatment stages, the purified water may be held in a storage reservoir before delivery. Ozone gas or a liquid containing ozone may be introduced into this reservoir to provide disinfection and to provide odor and taste enhancement of the water before it is discharged. The water storage reservoir may serve as a chilled water supply. Care must be taken to avoid making the walls of this reservoir too thin to avoid freezing of the water in the reservoir. A sensor can be provided in the reservoir to avoid freezing.

Alternatively, or in combination with other embodiments of the invention, ozone gas may be introduced into the refrigerator compartments in order to control odor and maintain food freshness.

Water drains may also be provided from the aforementioned filtration devices to a common discharge point in the refrigerator since said filtration devices may produce reject water. The reject water lines may also be in communication with water rejected from the electrochemical ozone generator.

In addition to introducing ozone into the water storage reservoir, ozone as a gas or dissolved in liquid may be introduced up stream of the water filtration elements. The ozone which is introduced at these points serves to kill microorganisms including bacteria, viruses and protozoa, spores, and cysts, including attached biofilm microorganisms in the water treatment system. The ozone will maintain a clean condition of the filtration elements either membrane or carbon filtration. The electrochemical ozone generator may be in contact with the chilled refrigerator compartments. A wall may be used to separate it from either the chilling or freezing compartments. For example, the ozone generator may be in a walled compartment where at least one wall or a portion of the wall borders on the chill or freezer compartment. The thickness of the wall and physical properties of the wall are such to prevent freezing of the water in the electrochemical cell. However, the thickness is sufficient to allow heat transfer from the ozone generating cell through the enclosing wall to the chilled compartment. The ozone generating cell enclosure may be in physical connection with the chilled water storage reservoir to enable heat to pass from the ozone generator to the chilled water storage reservoir.

The water conduit from the source water inlet or the purified water stream to the electrochemical ozone cell contains a flow restriction device. Water that is contained in the electrochemical ozone cell cannot backflow and make contact with the inlet water stream. The backflow restriction device may include a check valve, which also guards against loss of pressure.

It is desirable for the refrigerator compartments to be chilled. The compartments will be at or close to the freezing point of water. The compartments may also be below the freezing point of water. It is desirable for the electrochemical ozone generator's structural elements and the fluids contained inside the ozone generator to be at a temperature significantly above the temperature of the refrigerated compartments (10–20° C.). However, it is desirable for the said ozone generator to be at a temperature below that normally encountered outside the refrigerator, e.g., room ambient air temperature. The invention utilizes the chilled compartments to maintain the cell temperature of the electrochemical ozone generator. This is accomplished by placement of the electrochemical cell in contact with or close to the wall of the chilled compartments. The desired temperature is maintained through use of a spacer material with defined heat conduction properties, typically a polymer. The spacer material regulates the heat transfer between the electrochemical ozone cell and the chilled compartment.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a block diagram of a water treatment system having an electrochemical ozone generator operating at a pressure substantially higher than ambient pressure. Water at a standard delivery pressure, such as house pressure, is delivered to the system. An electrochemical ozone generator sub-system is directly attached to the water delivery or distribution system.

FIG. 3 is a block diagram of a water treatment system having an ozone generation and delivery sub-system to deliver and engage ozone on the inlet side to a process.

FIG. 4 is a block diagram of a water quality monitoring system having an audible or visual indicator. Based upon the available information, the controller may control the operation of the ozone generation sub-system and may provide one or more indicators as to the status of the system.

FIG. 5 is a block diagram showing a possible waste gas destruct sub-system as a part of an overall water treatment sub-system.

DETAILED DESCRIPTION OF THE INVENTION

Figure 1:
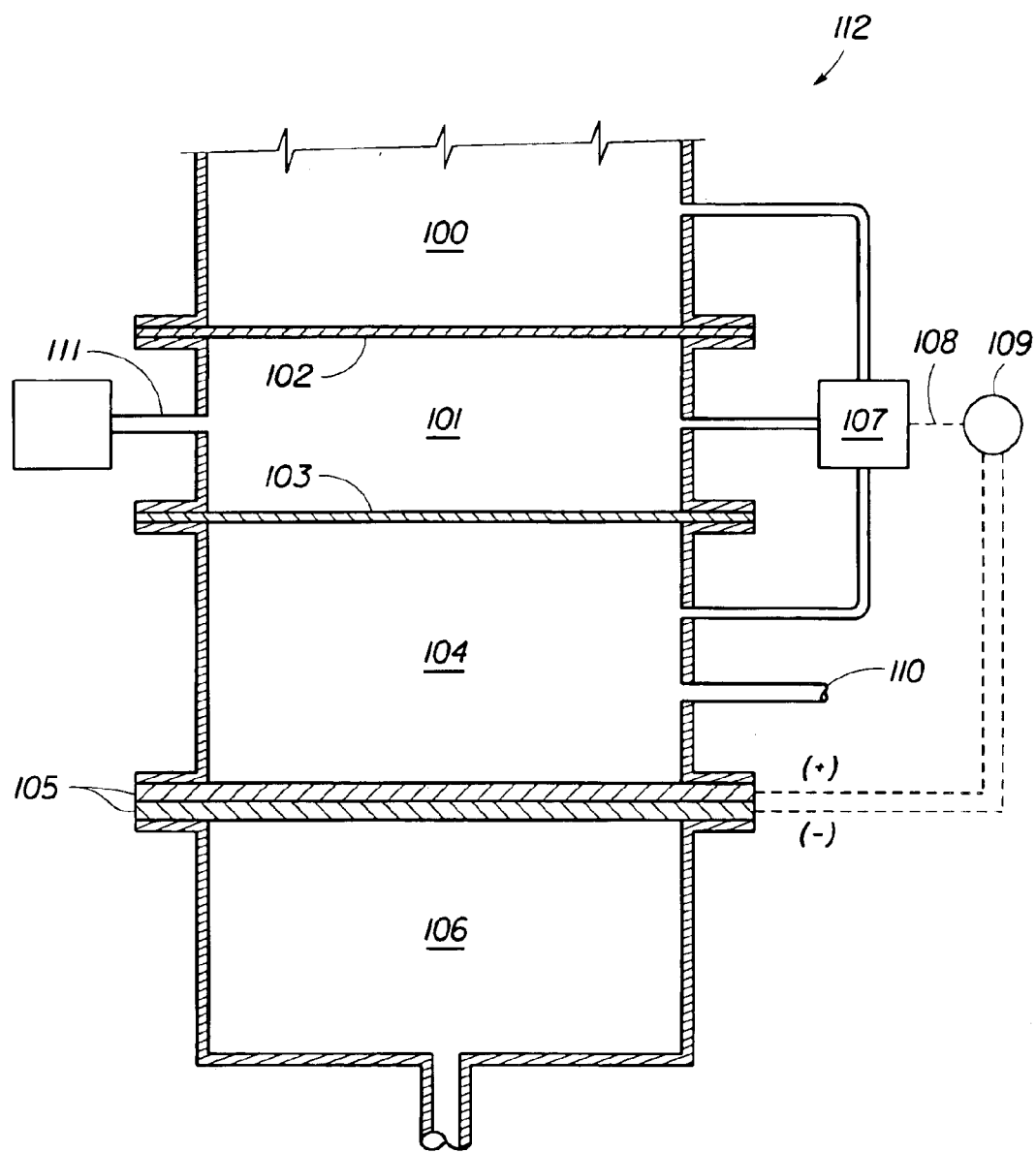
FIG. 1 is a schematic view of an electrochemical ozone generator sub-system having an electrochemical ozone generator with hydrophobic phase separating membranes to prevent the anode water and the water to be treated from mixing. A differential pressure sensing element is used to verify the integrity of the phase separation membranes.

The present invention provides for the electrochemical generation of ozone for use in "point-of-use" applications. The electrochemical ozone generators or systems of the present invention may be used to provide disinfected water, ozone-containing water, and/or ozone gas. Disinfected water may be produced by introducing ozone gas into a potable or purified water source for the purpose of disinfecting or controlling the microorganisms in the water source. Ozonated water or ozone gas may be produced and provided for various anti-microbial and cleansing applications of the consumer, such as washing food, clothing, dishes, countertops, toys, sinks, bathroom surfaces, and the like. Furthermore, the ozone generator may be used to deliver a stream of ozone-containing water for the purpose of commercial or residential point-of-use washing, disinfecting, and sterilizing medical instruments and medical equipment. For example, the ozone-containing water may be used directly or used as a concentrated sterilant for the washing, disinfecting, and sterilizing of hemodialysis, peritoneal dialysis, rigid and flexible endoscopes, catheters, surgical instruments, dental fixtures, contact lenses, and the like. Ozone gas may also be used in many of the foregoing examples, as well as in the deodorization of air or various other applications. The various aspects of the invention allow the electrochemical ozone generator to operate in a nearly or entirely passive manner with heretofore unmatched simplicity of design.

In a first aspect of the invention, a hydrophobic membrane is placed between the anode or anode reservoir where the ozone is being generated, and the water being disinfected. There is no particular restriction on the nature of the hydrophobic membrane to be used in the apparatus and the hydrophobic membrane may be formed with, for example, PTFE (ethylene tetrafluoride resin) so called TEFLON® (a trademark of DuPont of Wilmington, Del.), PFA (ethylene tetrafluoride-perfluoroalkoxyethylene copolymer resin), PVDF (vinylidene fluoride resin), FEP (ethylene tetrafluoride-propylene hexafluoride copolymer resin), ETFE (ethylene tetrafluoride-ethylene copolymer resin), etc., and the pore size of the hydrophobic membrane may be selected such that water does not permeate through the hydrophobic membrane used, and is preferably from about 0.01 to 10 $\mu$m, and more preferably from 0.1 to 2 $\mu$m thick.

This hydrophobic membrane serves the function of ensuring separation between the waters of different quality, e.g., the water to be treated may contain chlorine or ions that should not be allowed to come in contact with the anode water and the anode water may contain byproducts or contaminants that should not be transferred to the water to be treated. The two water types may be maintained at different pressures and the system may be equipped with a differential pressure sensor to detect the failure of the separating membrane or membranes.

As further protection to prevent mixing between the two water types, a second hydrophobic membrane may be placed in series with the first hydrophobic membrane and the volume enclosed between the two membranes maintained at a pressure different than either the anode water source or the source of water to be disinfected. A pressure sensor or other means of monitoring the pressure differential across each hydrophobic membrane may be used to insure the integrity of each of the membranes.

In another aspect of the invention, the electrochemical ozone generator may be operated at a pressure that is comparable to the pressure of the water to be disinfected. In this manner, the ozone gas being generated may be directly introduced to the water to be disinfected without the requirement for a venturi, pumps, or compressors.

In another aspect of the invention, the ozone gas generated by the electrochemical ozone generator is introduced upstream of a water filtration and/or treatment system to prevent the growth of biofilms which are known to shorten the useful life of filters, carbon blocks, and other filtration media.

In another aspect of the invention, the ozone gas generated by the electrochemical ozone generator is introduced upstream of a membrane-based water treatment system, such as reverse osmosis (RO) or ultrafiltration systems, to prevent the growth and accumulation of biofilms which are known to reduce the functionality of such membranes. The ozone may be introduced periodically or in a controlled manner to prevent oxidation of the membrane of the water treatment system or other components having limited tolerance to ozone.

In another aspect of the invention, a visual or audible indicator is used to provide an indication to the user as to the performance of the electrochemical ozone generator. In one embodiment, the indication is the result of a sensor designed and operated to quantify the amount of ozone dissolved in the water to be disinfected, the anode reservoir, or any other suitable monitoring location. In another embodiment, the indication is the result of the measurement of the voltage across and the current through the electrochemical cell generating the ozone. The output of the electrochemical cell may be correlated to the operating parameters of the cell and may therefore be used to monitor the performance of the ozone generator. As an example, the voltage between the anode and cathode of the electrochemical cell is indicative of the electrochemical process, and the voltage may be used to determine if the electrochemical cell is producing oxygen or ozone.

In many installations of the system, the waste hydrogen gas that is a byproduct of the electrochemical ozone generator process may not be vented or is not easily disposed. Therefore, a hydrogen destruct system may be incorporated to combine hydrogen with oxygen from the air to form water vapor which is more easily disposed.

Optionally, the hydrogen may be combined with any surplus gas stream that originated from the anode of the electrochemical ozone generator. The source of this gas stream may be excess gas directly from the generator or it may be gas that is vented from the water to be disinfected after the ozone has been engaged with the water to be disinfected.

The electrochemical ozone generator may operate as a sub-system to an overall water treatment system that includes a reverse osmosis system. Water from the reverse osmosis system may be used in the anode of the electrochemical ozone generator directly or after further processing using, for example, a resin bed designed to scavenge ions from the water source. The resulting ozone may then be used to treat water of any quality, before and/or after various processes and sub-systems of the water treatment system.

The systems of the present invention lend themselves to "point-of-use" applications, which for all purposes herein shall be taken to include "point-of-entry" applications. The "point-of-entry" is generally accepted to be the place where water enters the home or facility from the water source while "point-of-use" is in the vicinity of its consumption. The water treatment at the point-of-entry processes the water for the entire home or facility. In contrast, point-of-use water treatment processes the water in the general location where the water is consumed for drinking, bathing, washing, or the like.

In another aspect of the invention, cooling of the electrolytic cell to or below ambient temperature may be provided by the process being treated. Cooling is generally required to prevent the inefficiencies of the electrochemical process from raising the temperature of the anode above approximately 35° C. to minimize the thermal decomposition of the ozone produced. Cooling of the ozone or ozone-containing water to temperatures between ambient and the freezing point of water serves to extend the lifetime of the ozone as well as enhancing the solubility of the ozone in the water. As an example, should the ozone generator be utilized to treat water entering or being delivered from a refrigerator or freezer, the ozone generator may be located within the refrigerator or in partial thermal contact or communication with the freezer.

As another aspect of the invention, water containing high quantities of dissolved ozone may be provided at the point-of-use for use as a wash or disinfectant. An additional water faucet near the kitchen sink may be used to provide a stream of ozone-containing water for the washing of food, countertops, toys, utensils, etc.

The construction of the ozone generator may be such that it lends itself to mass production in the form of direct injection molding of a thermoplastic around the electrodes, membrane, flow fields, etc. The proton exchange membrane (PEM) and the anode catalyst are both temperature sensitive and must be protected from excessive temperatures (above 180° C.) during the manufacturing process. Furthermore, the proton exchange membrane is not a solid, but takes on properties similar to a gel when fully hydrated. Therefore, another aspect of the invention is a sealing ring which provides a bead-and-groove or elastomer seal with the membrane around the active area of the electrolyzer and extends out to the thermoplastic where a seal is formed during the injection molding process. During manufacturing, the components are pre-assembled, clamped together with a thermoplastic clip, inserted into the injection mold and the thermoplastic injected. The anode and cathode porous substrates are in direct contact with the molding surfaces to insure the precise thickness of the assembly and to remove heat during the molding process from the catalyst and membrane.

In another aspect of the invention, the quality of the water used in the electrochemical cell may be improved through an electrodeionization or electrodialysis process to provide a continuous stream of deionized water without the need for consumables. Regardless of the quality or source of the water, which may include a potable and/or filtered water source, water must be provided to the electrochemical cell in sufficient quantities to support the electrolysis reaction of water to form ozone and to hydrate the ion exchange membrane. Water is traditionally provided directly to the anode since this is where the ozone formation reaction takes place and water is transferred from the anode to the cathode by electroosmosis. However, in accordance with the present invention, water may be provided to the cathode for back diffusion to the anode and membrane, laterally to the membrane (perhaps a tubulated membrane as described in U.S. Pat. No. 5,635,039 which is incorporated herein by reference), or by a wick provided for that specific purpose.

In another aspect of the invention, when the ozone generator is used in conjunction with a refrigerator, a portion of the ozone gas from the generator or of the unconsumed ozone gas from the water to be treated may be vented into the refrigerator or freezer chamber to provide treatment of the air, thus, odor control and food freshness can be maintained in the refrigerator and freezer compartments.

In another aspect of the invention, when the ozone gas is being used to provide disinfection of potable water, any residual ozone may be eliminated from the potable water stream by a carbon block, granulated activated carbon, ultraviolet lamp, microwaves or heat.

In another aspect of the invention, the electrochemical ozone generator may be optimized for placement within other components of the water treatment system. For example, the ozone generator may be entirely contained within the RO water reservoir with necessary connections for electrical leads and hydrogen venting, placed entirely within a filter housing, water spigot, etc. Furthermore, the electrochemical ozone generator may be made disposable and integrated with other disposable components such as a reverse osmosis membrane, carbon filter and/or other filter elements, etc.

In another aspect of the invention, ozone gas not dissolved in the water to be disinfected may be removed with the use of a hydrophobic membrane placed in the upper portion of a water reservoir. The surplus ozone gas may then be passed through a destruct subsystem such as an ozone destruct catalyst or heated catalyst before being vented.

In another aspect of the invention, electroosmotic cathode water may be used to pressurize portions of an electrochemical ozone generating sub-system of the water treatment system. For example, the electroosmotic cathode water from an electrochemical ozone gas generator operating at the pressure of a reverse osmosis storage reservoir may be used to provide water to an electrochemical ozone generator operating at the higher pressure of the inlet water or at the pressure of a carbon block or other filter element. Therefore, the pressure of an electrochemical ozone generator may be matched to the pressure of the water to be treated with the electroosmotic generated water being used to develop the necessary pressure. In a related example, a secondary electrochemical cell, such as an oxygen generator, may be installed as a sub-system for the sole purpose of delivering high pressure water for use in an electrochemical ozone generator elsewhere in the system.

In another aspect of the invention a physical barrier, such as a gas-containing gap, is provided between the anode water and the water to be treated to prevent cross contamination between the anode water and the water to be treated. This gas space may be provided by a float system, hydrophobic membranes, mechanical level control valves, etc.

In another aspect of the invention, for use in systems having a captive gas reservoir (headspace or bladder type) for the delivery of water under pressure, an electrolyzer may be used to pressurize the reservoir. Furthermore, the size of the electrolyzer, reservoir, etc., may be correlated such that delivery of water from the reservoir is at a rate that is matched to the ozone generation rate, ensuring that the water has been suitably engaged with the ozone. Delivery of water at a rate higher than a sustainable ozone generation rate will result in a pressure drop within the reservoir, lowering and eventually stopping water delivery.

In another aspect of the invention, the electrochemical ozone generator is located inline (such as in a tee) between various sub-systems in a water treatment system.

FIG. 1 shows an electrochemical ozone generator sub-system 112 having an electrochemical ozone generator 105, an anode reservoir 104, a cathode reservoir 106, and is attached to a source of water to be treated 100 with hydrophobic phase separating membranes 102, 103 to prevent the water in the anode 104 from mixing with the water to be treated 100. An intermediate region 101 bounded by gas permeable hydrophobic membranes 102, 103 may be held at a pressure significantly different from either of the water containing areas 100, 104. Pressure in the intermediate region 101 and the anode reservoir may be controlled by an external means through connections 111 and 110 respectively. A differential pressure sensing element 107 monitors the pressure differential between the chambers 100, 101, 104 and compares the pressure differential to a predetermined reference. Should the pressure differential fall outside a preferred range, the control system 109 may remove power from the electrolyzer 105 or provide an indication to the user that service is required. Alternatively, if the intermediate reservoir 101 is held at a pressure lower than either the water to be treated 100 or the anode reservoir 104, a flow monitor on the end of the connector 111 could be used to detect excessive flow of water from either 100 or 104 through a failed membrane 102 or 103 respectively.

FIG. 2 is a block diagram of a water treatment system 161 having an electrochemical ozone generator 155 operating at a pressure substantially higher than ambient pressure. Water at a standard delivery pressure, such as house pressure, is delivered to the system through 150 and enters an initial treatment chamber (such as a filter for the removal of sediment) 151 which provides a pressure drop to the system during water flow so that the water exiting the filter at 152 is at a lower pressure than that entering 150. A number of additional processing steps (shown as a single step 153 with connections 152 and 154) may further reduce the water pressure during water flow. An electrochemical ozone generator sub-system 155 and support system 159 (together representing a system such as 112 of FIG. 1) is directly attached to the water delivery or distribution system. The pressure of the ozone generator sub-system 155 is allowed to fluctuate with the water pressure in the water delivery or distribution system 156 depending upon the flow rate, the initial inlet pressure to 150, etc. The ozone is generated and delivered to the distribution system 156 which may also include a water reservoir system 160, a flow control device 157 and a spigot 158.

FIG. 3 is a block diagram of a water treatment system 186 having an ozone generation and delivery sub-system 179 to deliver and engage ozone on the inlet side to a system where the water quality in the main stream 184, 176 is not compatible with the requirements of the ozone generator sub-system 179. A restriction, pressure regulating component, pre-filter, or pre-processing sub-system 185 may be utilized to provide a pressure drop between the inlet water 184 and the point of ozone introduction 176. This pressure difference will allow water to flow as needed from the water inlet 184 to a water treatment sub-system 187 through a connection 175. Water may then flow from the conditioning sub-system 187 to the ozone generator sub-system 179. The ozone generator system may then operate at a pressure comparable to the pressure at the point of ozone introduction in the primary water stream 176. The ozone generation and introduction may be used across any number of sub-systems 180, such as reverse osmosis, ultrafiltration, deionization, etc., and reservoirs 181.

FIG. 4 is a block diagram of a water quality monitoring system 200 having an audible or visual indicator 214. An ozone generation and engagement sub-system 210 delivers ozone through a conduit 203 to the primary water stream 202 entering from a water source 201. The concentration of ozone is monitored at points throughout the distribution and delivery system using ozone monitors 204, 207 in connection to a control system 213. The control system 213 is also provided with the operating parameters of the ozone generator sub-system 210 through connections 211. Information provided to the controller may include, among other parameters, the current through the ozone generator, the voltages of the generator, temperature, etc. Based upon the available information, the controller 213 may control the operation of the ozone generation sub-system 210 through a connection 212 and may provide one or more indicators 214 as to the status of the system.

FIG. 5 is a block diagram showing a possible waste gas destruct sub-system 231 as a part of an overall water treatment sub-system 225. As the primary water stream 226 is treated with ozone from an ozone generation and engagement sub-system 227 waste hydrogen is generated as a byproduct of the electrochemical reaction. This hydrogen is delivered by a conduit 229 to a waste gas destruct sub-system 231 where the hydrogen is combined using a noble metal catalyst with oxygen from the air delivered by an air pump 230. Additional oxygen and possibly surplus ozone may be collected from another region of the treatment system such as a reservoir 233. The surplus gas may be separated from the water by a phase separator 234 and the gas provided to the destruct system 231 through a conduit 236. Primary water, free from undissolved gas, may be delivered to the distribution and delivery system continuing from conduit 235. An auxiliary heater 238 may be attached to the destruct sub-system to insure that the catalyst within the destruct system 231 is dry and active. Harmless gaseous and/or liquid products exit the waste gas destruct subsystem 231 by means of conduit 232.

Figure 6A:
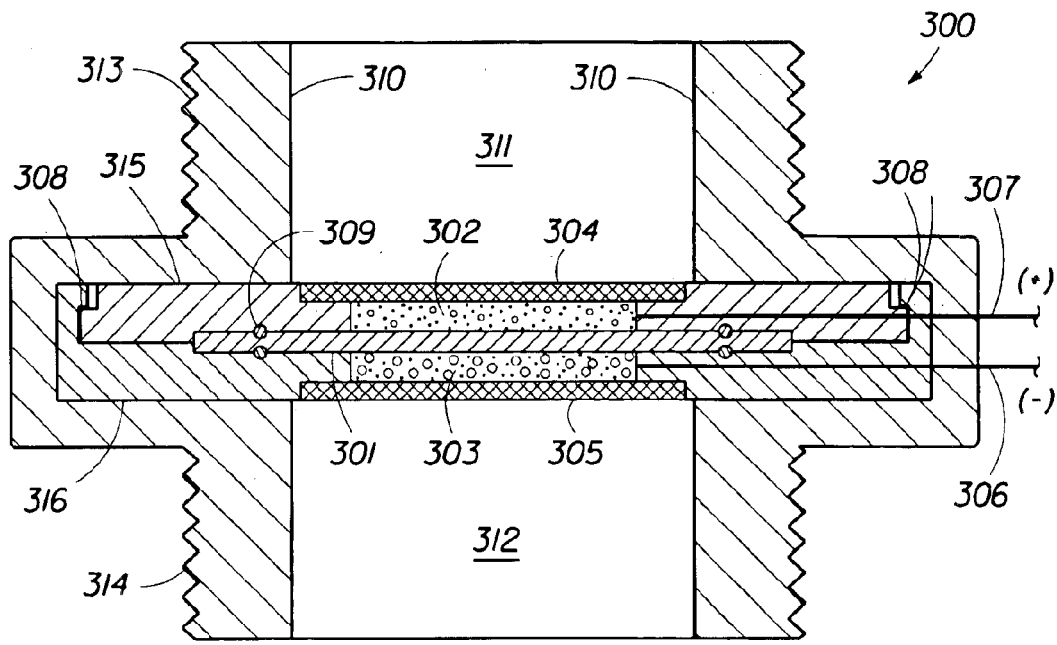
FIG. 6A is a cross sectional diagram of an electrochemical cell. This core assembly may be used as a single cell electrolyzer or may be injection molded as an insert to form a complete electrolyzer system.

FIG. 6A is a cross sectional diagram of an electrochemical cell 300 that includes a proton exchange membrane (PEM) 301 in contact with an anode catalyst and porous substrate 302 and a cathode catalyst and porous substrate 303. The anode and cathode substrates are backed by flow fields 304 and 305, respectively, that may optionally serve as a means of support for the anode and cathode. Electrical connection may be provided by the flow fields 304, 305 or through electrical conductors 306, 307 provided specifically for that purpose. A seal 309, such as an elastomer or bead-and-groove, is preferably provided to seal each side of the proton exchange membrane so that the anode and cathode operate as isolated systems. The entire core assembly 301, 302, 303, 304, 305, may be held together by molded plastic pieces 315, 316 which may be configured to snap together by a latch 308 or otherwise secured to form a single unit. This core assembly may then be used as a single cell electrolyzer or may be injection molded as an insert to form a complete electrolyzer assembly containing an anode reservoir 311, a cathode reservoir 312 a structural means of support 310 and a means of securing to an associated system by means of threads 313, 314 shown for the anode and cathode reservoirs 311, 312 respectively.

Figure 6B:
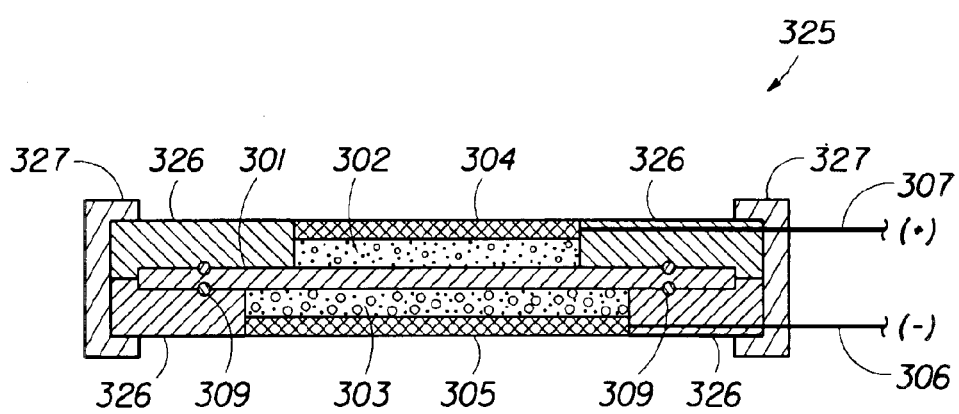
FIG. 6B is a sectional diagram of another design of electrochemical cell.

FIG. 6B is a cross sectional diagram of an electrochemical cell 325. The system includes a proton exchange membrane (PEM) 301 in contact with an anode catalyst and porous substrate 302 and a cathode catalyst and porous substrate 303. The anode and cathode substrates are backed by flow fields 304 and 305, respectively, that may also serve as a means of support for the anode and cathode. Electrical connection may be provided by the flow fields 304, 305 or through electrical conductors 306, 307 provided specifically for that purpose. A seal 309, such as an elastomer or bead-and-groove, is preferably provided to seal each side of the proton exchange membrane so that the anode and cathode operate as isolated systems. The one or two piece ring 326 provides compression on the seal 309 against the proton exchange membrane 301 and prevents molten thermoplastic from entering the flowfields 304, 305 during a subsequent injection molding process. The ring 326 also eliminates the requirement for direct sealing between the gel like proton exchange membrane 301 and the thermoplastic housing or body formed in subsequent injection molding processes. The entire core assembly 301, 302, 303, 304, 305 may be held together by a molded plastic clip 327 after assembly and may be removed before injection molding or may be integrated into the molding.

Figure 7:
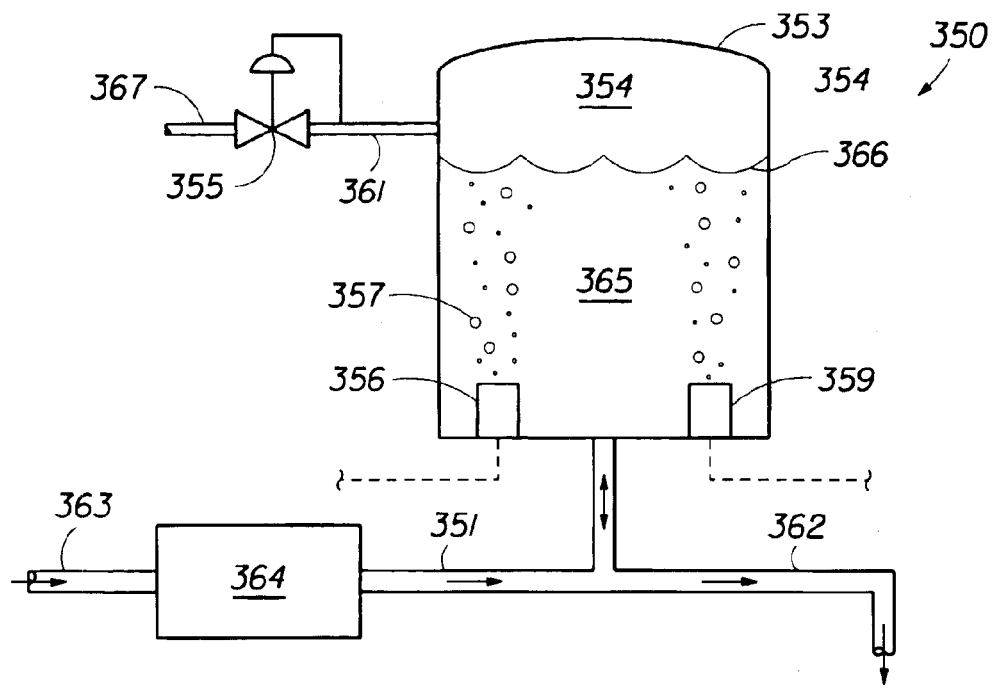
FIG. 7 is a schematic diagram of a water treatment, storage, and delivery system that contains a bladderless reservoir to provide short term water delivery when the water generation rate is substantially less than the short term demand. Through management of system variables, the system designer may insure that a minimum average contact time is provided.

FIG. 7 is a schematic diagram of a water treatment, storage, and delivery system 350 that contains a bladderless reservoir 353 to provide water delivery when the water generation rate is substantially less than the short term demand for water so a water reservoir is required. Water is provided to the treatment sub-system 364 from a water source by an inlet 363. The outlet 351 of the treatment sub-system 364 is in communication with the water delivery system 362 and a water storage reservoir 353. The water storage reservoir 353 is provided with a headspace 354 that compresses as the reservoir is filled and expands as the water is taken from the reservoir. An ozone generator 356 is placed in communication with the storage reservoir and the ozone gas 357 enters the reservoir and is engaged with the water 365. As oxygen and ozone gas is added to the reservoir by the electrochemical generators 356, 359 the pressure in the headspace 354 will increase and if the pressure goes above a preset value, water may exit from the reservoir 353 through a conduit 361 when a back pressure controller 355 opens. The discharge 367 from the back-pressure controller 355 may be connected to a suitable drain, phase separator, etc. This back pressure controller may be set to open at a pressure that is higher than the ultimate pressure generated by the water treatment sub-system 364 so that water is not continuously dumped from the reservoir 353 and wasted. As gas is delivered to the reservoir 353, that gas which is not dissolved in the water will collect in the headspace 354 and eventually increase the pressure in the storage reservoir 353 if water is not removed from the system 350 through conduit 362. The back pressure controller 355 will then maintain the pressure and the water level 366 within the reservoir at a predetermined maximum. As water is consumed and the headspace 354 expands the pressure within the reservoir 353 will be reduced and the process 364 will resume operation. As water consumption continues and the headspace further increases, the pressure within the reservoir may fall below the point where water delivery is possible and water flow out of the discharge 362 will be significantly reduced or stopped. Therefore, the rate of water delivery from the reservoir 353 is related to the gas generation rate of the electrochemical generators 356, 359 and the water production rate of the treatment sub-system 364. Through management of system variables, the system designer may insure that a minimum average contact time is provided.

Figure 8:
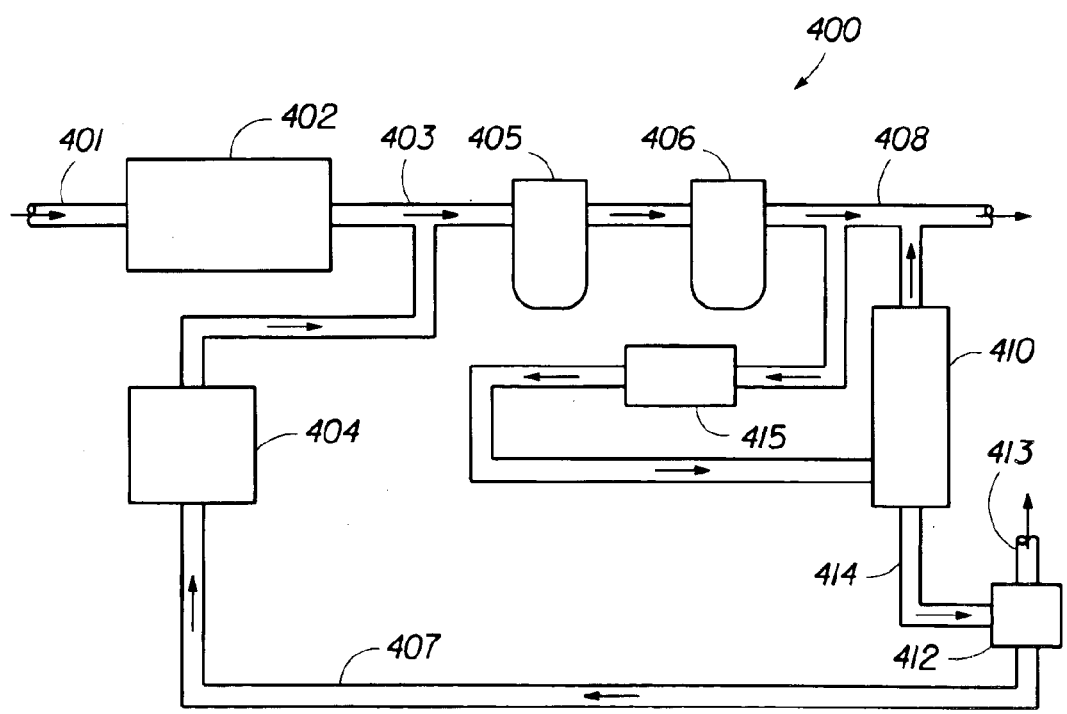
FIG. 8 is a system diagram of a water treatment unit having multiple electrochemical systems operating at various pressures where the operating pressure of an electrochemical gas generator may be equal to or substantially higher than the pressure in the main water stream.

FIG. 8 is a system diagram of a water treatment unit 400 having multiple electrochemical systems operating at various pressures. Water enters a first processing sub-system 402 through a water inlet port 401. An electrochemical ozone generator 404 injects ozone into the primary stream 403. However, if the water quality in the primary stream at that point in the water treatment unit is not suitable for use in the electrochemical system 404, water must be provided from another source at a pressure equal to or higher than the pressure at point 403. Therefore, a second electrochemical generator may be attached at a point in the main process stream having higher quality water 408 that may be easily treated for use in the electrochemical cell 410 by a pretreatment system 415 such as an ion exchange resin bed. The electroosmotic water and hydrogen gas generated by the electrochemical gas generator 410 may be delivered by a conduit 414 to a phase separator 412 where the gas is released 413 and the water is provided through conduit 407 to the electrochemical gas generator 404. Therefore, the operating pressure of the electrochemical gas generator 404 may be equal to or substantially higher than the pressure in the main water stream 403. The water source located downstream after any number of processes 405, 406, where the water quality is higher but the pressure is lower than at the water inlet 401 or the gas introduction point 403, is purer.

Figure 9:
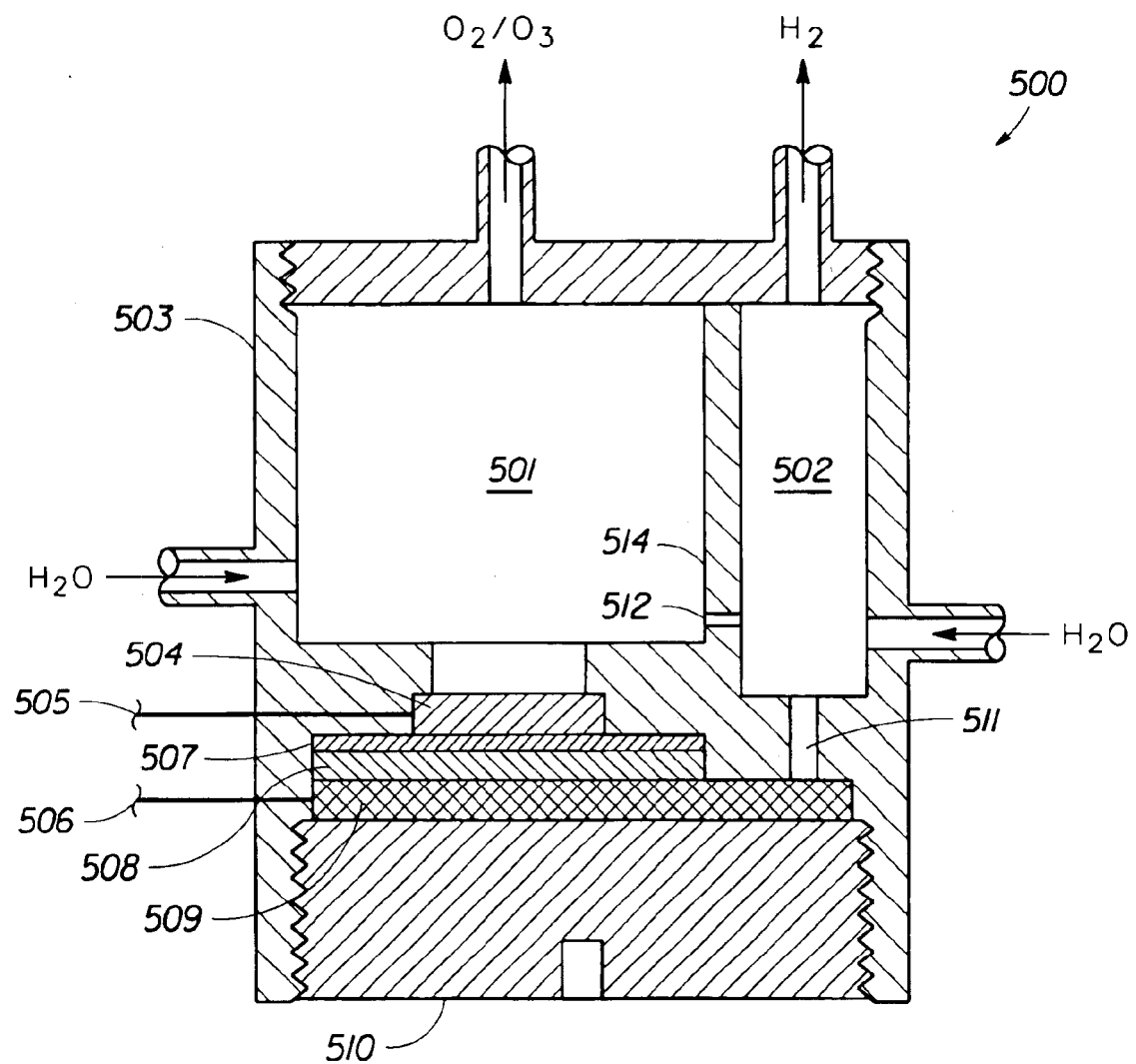
FIG. 9 is a diagram of a example ozone generator that has been designed and fabricated to be directly connected to a water reservoir.

FIG. 9 is a diagram of an ozone generator 500 that is designed to operate in direct fluid communication with a water treatment device, such as the water reservoir for a reverse osmosis system. The system is fabricated from a single housing 503 made from a material suitable for use with ozone. The system includes an anode reservoir 501 and an anode frit 504 made from porous titanium having a lead dioxide catalyst coating on the side in contact with the first side of a proton exchange membrane 507. The second side of the proton exchange membrane is in contact with a second frit 508 made from porous stainless steel. Each porous frit 504, 508 is provided with a lead 505, 506 formed from the same material as 504 and 508, respectively, and spot welded to each frit to provide electrical connection to the anode and cathode. Directly supporting the porous stainless steel frit 508 is an expanded stainless steel flowfield 509 that provides a fluidic connection to the cathode reservoir 502 through a conduit 511. The assembly 504, 507, 508, 509 is held in place with a threaded plug 510. The plastic housing 503 accepts the components 504, 507, 508, 509 and provides a seal between the anode and cathode by compressing the proton exchange membrane 507 between the stainless steel cathode frit 508 and the plastic housing 503. In the present system, cathode water is allowed to return directly to the anode reservoir 501 by a depression 512 in the divider 514 between the anode reservoir 501 and the cathode reservoir 502. Both the ozone gas and the hydrogen gas are allowed to enter the water in the reservoir or, alternatively, the system may be fitted with a port to redirect the hydrogen to a location other than the anode reservoir 501.

Figure 10:
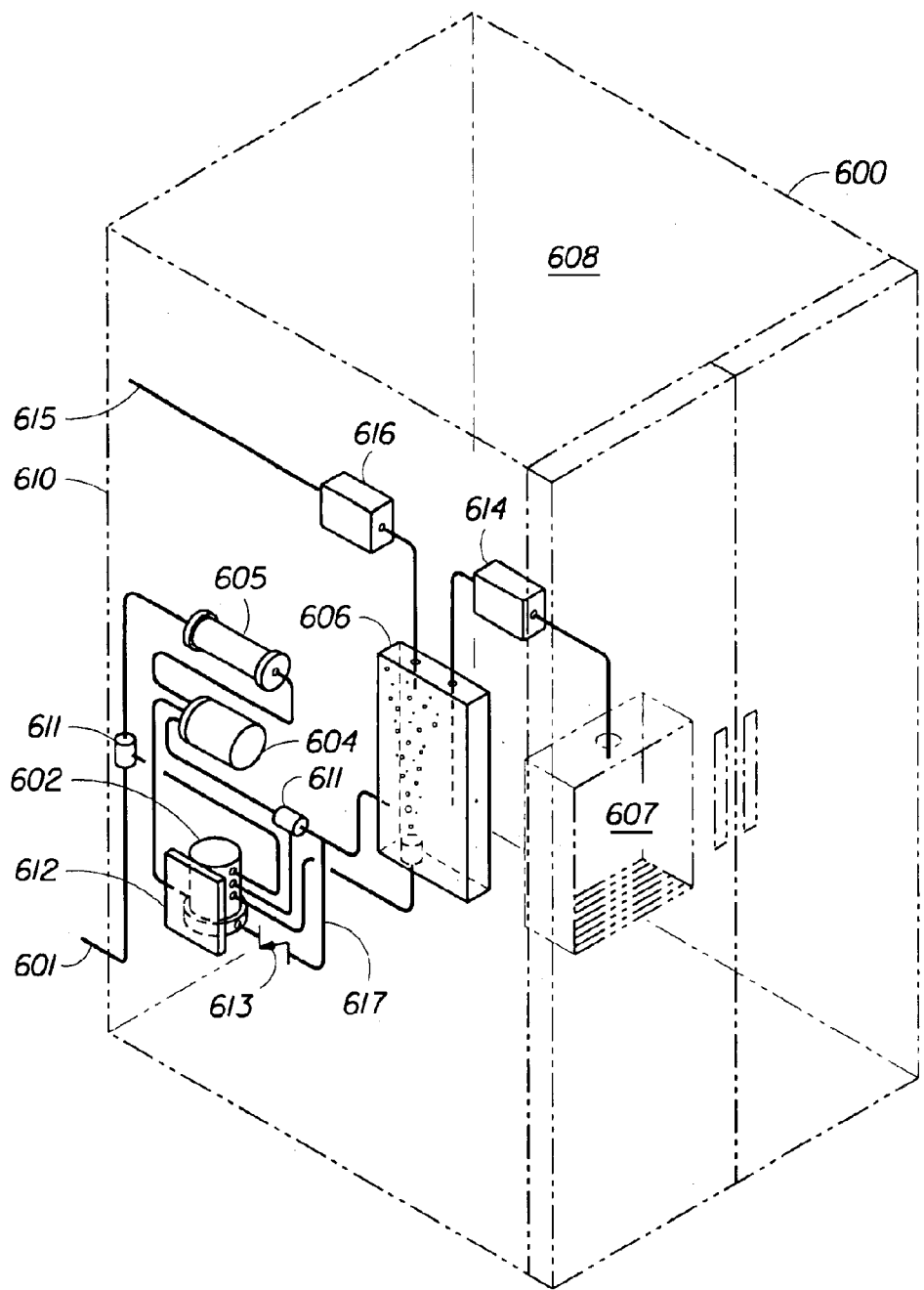
FIG. 10 is a diagram showing the integration of a point-of-use microorganism control device into a refrigerator having a through-the-door feature.

FIG. 10 is a schematic diagram showing the integration of a point-of-use microbial control system into a refrigerator having a water dispenser. In this system a refrigerator 600 is provided with a pressurized water supply 601 feeding a carbon filter 605 and a reverse osmosis purifier 604 in series. Water from the reverse osmosis unit 604 is provided through conduit 617 and backflow prevention device 613 to an ozone generator 602 which is in thermal contact with a side wall 610 of the refrigerator compartment 608 but separated by a temperature regulating layer 612 to prevent the electrolyzer from freezing. Ozone from the electrolyzer 602 exits the ozone generator and is distributed among the injection points such as 611 leading to the reverse osmosis purifier and a chilled water storage reservoir 606. Ozone is removed from the water storage reservoir and surplus ozone is destroyed by an exit gas treatment system 616. The ozone containing water in the storage reservoir 606 passes through a fluid deozonation system 614 before being delivered to the user at the water dispenser 607.

EXAMPLE

An ozone generator was designed and fabricated in accordance with FIG. 9 to produce about 0.16 grams of ozone per 24 hours. A single electrolyzer cell with an active area of approximately 0.08 $cm^2$ was used to generate and deliver ozone gas directly to a storage reservoir containing reverse osmosis quality water. The system was fabricated from polyvinyl difluoride (PVDF) and was approximately 2 inches in length. The system consisted of six individual pieces: a plastic housing, an ⅛" diameter porous titanium anode frit coated with lead dioxide, a ¼" diameter nation proton exchange membrane, a ¼" porous stainless steel frit, and a ½" diameter expanded stainless steel flow field and a plug that is screwed into the bottom of the assembly to hold all the components in the housing. The proton exchange membrane is also used as a gasket to provide sealing between the cathode and anode.

The porous titanium and the porous stainless steel frits are fitted with leads that extend outward through the wall of the vessel to provide electrical connection to the porous materials. These leads are potted with epoxy in the housing. The PEM was a sheet of perfluorinated sulfonic acid polymer, NAFION 117.

Cooling for the generator is provided by direct contact with the water reservoir, which is sufficient to dissipate the one-half Watt of thermal energy generated by the device. The system may be operated at any temperature between the freezing and boiling points of water, but most preferably from above freezing to ambient to maximize the lifetime of the ozone gas being generated. No water management is necessary since water is provided by the reverse osmosis system.

A DC power supply having two output levels was fabricated. This power supply provided a nominal constant current of 167 mA in standard operation, and a constant voltage output of 2 volts for standby operation.

While the foregoing is directed to the preferred embodiment of the present invention, other and further embodiments of the invention may be devised without departing from the basic scope thereof, and the scope thereof is determined by the claims which follow.

What is claimed is:

1. A method of making an electrochemical cell comprising:
   securing an anode, a cathode and an ion exchange membrane disposed between the anode and the cathode between opposing members of a premolded thermoplastic frame, wherein the thermoplastic frame maintains the anode, the cathode, and the membrane in intimate contact,
   wherein the step of securing further comprises securing the opposing members face to face without a separator plate.

2. The method of claim 1, wherein the step of securing the opposing members face to face comprises:
   injection molding around the premolded thermoplastic frame.

3. The method of claim 1, wherein the step of securing the opposing members face to face comprises:
   injection molding around a plurality of premolded thermoplastic frames.

4. The method of claim 1, wherein the step of securing the opposing members face to face comprises:
   clamping the opposing members of the frame.

5. The method of claim 1, wherein the step of securing the opposing members face to face comprises:
   latching the opposing members of the frame.

6. The method of claim 1, wherein the step of securing the opposing members face to face comprises:
   threadedly securing the opposing members of the frame.

7. The method of claim 2, wherein the step of injection molding around the premolded frame comprises:
   forming a housing around at least a perimeter of the frame.

8. The method of claim 2, wherein the step of injection molding around the premolded frame comprises:
   forming a housing around the frame, wherein the housing comprises an anode reservoir in fluid communication with the anode arid a cathode reservoir in fluid communication with the cathode.

9. The method of claim 8, further comprising:
   forming a means for securing the housing to an associated system.

10. The method of claim 2, further comprising:
    preventing molten thermoplastic from contacting an active area of the cathode and the anode during the step of injection molding around the assembly.

* * * * *